W. D. BRADLEY.
GLASS AND CONCRETE CONSTRUCTION.
APPLICATION FILED DEC. 9, 1908.

934,136.

Patented Sept. 14, 1909.

Witnesses
Milton Lenoir
E. M. Klatcher

Inventor
William D. Bradley
by Gillson & Gillson
Attorneys

UNITED STATES PATENT OFFICE.

WILLIAM D. BRADLEY, OF CHICAGO, ILLINOIS.

GLASS AND CONCRETE CONSTRUCTION.

934,136. Specification of Letters Patent. Patented Sept. 14, 1909.

Application filed December 9, 1908. Serial No. 466,647.

*To all whom it may concern:*

Be it known that I, WILLIAM D. BRADLEY, a citizen of the United States, and resident of Chicago, county of Cook, and State of Illinois, have invented certain new and useful Improvements in Glass and Concrete Construction, of which the following is a specification and which are illustrated in the accompanying drawings, forming a part thereof.

The invention relates to the use of concrete and glass for construction, and more particularly for the production of pavements, roofs, and the like, wherein a wall or floor of great strength but still providing for the transmission of light therethrough, is required.

The invention contemplates means for preventing the fracturing of lights of glass embedded in concrete through pressure resulting from the unequal expansion and contraction of the concrete and glass by heat; and the object of the invention is to provide a partially transparent, or so-called illuminated pavement, which shall be strong and durable, which shall be transparent over a considerable proportion of its extent, and which shall not be affected by such changes in temperature as those to which structures exposed to the weather are commonly subjected.

Figure 1:
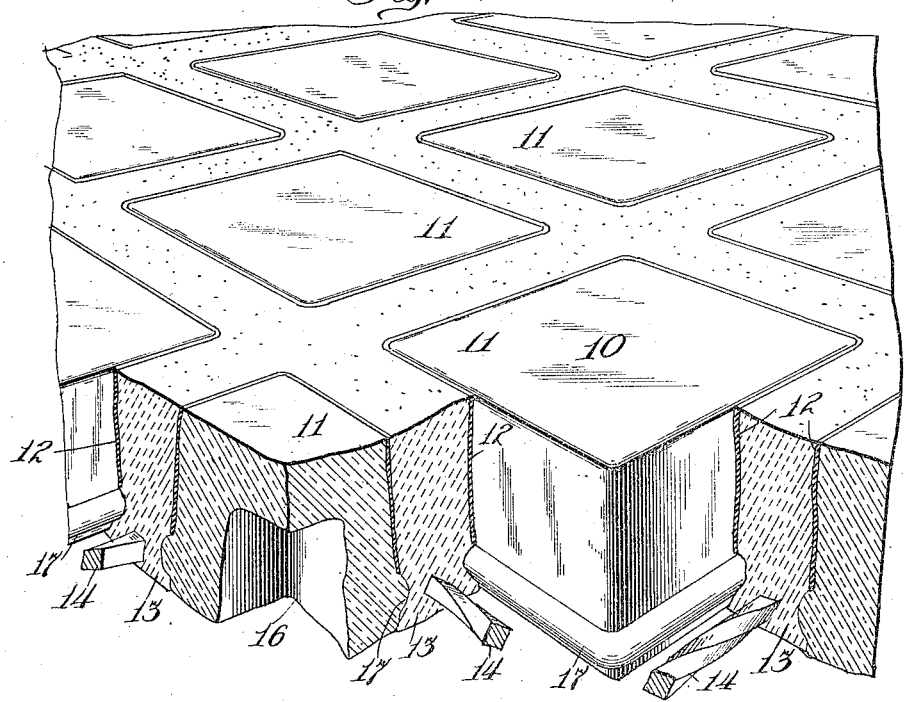
Figure 2:
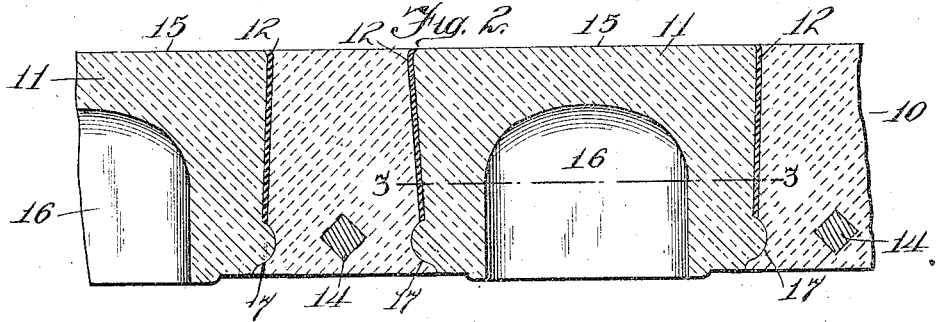
Figure 3:
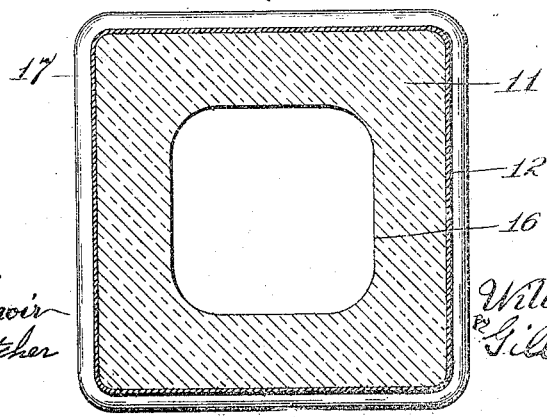

In the accompanying drawings, Figure 1 is a perspective view showing a pavement embodying the features of the invention, partly in section; Fig. 2 is a cross-sectional view of the same; and Fig. 3 is a plan sectional view showing a light of glass employed in the pavement illustrated in Figs. 1 and 2, separated from other parts, the plane of the section being indicated by the line 3—3, Fig. 2.

The drawings illustrate the application of the invention to the production of a pavement 10, such as may be used as a covering for that part of the basement of buildings which extends beneath the adjacent sidewalk. This form of pavement preferably comprises lights of glass 11, provided with a peripheral cushioning band 12, embedded in a reinforced concrete structure 13, the complete structure being erected by suitably supporting the lights 11 in the meshes of a grid of metal bars 14, such as are commonly used as a reinforcement for concrete, and the intervening spaces being filled with freshly mixed concrete. As shown, each of the lights of glass 11 takes the form of a block substantially equal in thickness to the thickness of the pavement 10, and having a smooth upper surface 15. As shown, the lower part of each of the lights is hollowed out or recessed, as indicated at 16, and the side walls of the lights have a peripheral bead 17 adjacent their lower edge. That portion of the side walls of the lights above the bead 17 is preferably made tapered or flaring, the light being larger at its top than at the upper margin of the bead 17, whereby the light is clenched in position upon the setting of the surrounding concrete.

The peripheral cushioning band 12 provided for each of the lights of glass 11 is most desirably formed of water proofing compound which will adhere both to the glass and to the concrete 13. A mixture of coal-tar and pitch may be conveniently employed as the material for this band, this mixture being such that it may be softened by heat and applied to the side walls of the lights of glass 11 by dipping the lights into it when softened, a coating of preferably one-sixteenth of an inch in thickness thus adhering thereto. In order that this band may not become displaced from the completed structure, should it be fused by excessive heat being applied to the structure in use, it most desirably terminates a short distance from the lower margins of the side walls of the lights of glass, these lights, as shown, being only submerged during the application of the band thereto by dipping, in such way as to receive a continuous peripheral coating extending over that part of the side walls above the bead 17. In the formation of the pavement 10, therefore, as shown, the concrete part 13 of the structure comes into intimate contact with the side walls of the lights of glass 11 over the surface of the bead 17, and that part of the side walls below the bead thus preventing any part of the cushioning band 12 being displaced from the space between the surface of the glass and the surrounding concrete.

Inasmuch as the peripheral cushioning band 12, provided for each of the lights of glass 11, permanently adheres both to the glass and to the surrounding concrete and is of waterproofing material, a substantially integral structure is provided, while the cushioning band prevents strains resulting from the expansion and contraction of the concrete by changes of temperature being transmitted to and fracturing the glass.

While the invention is more particularly described as being applicable to pavements, it is equally applicable to roof and side wall structures.

Because of the tapered or flaring form of the lights of glass 11 above the peripheral bead 17, broken lights may be readily replaced by new ones of similar form but without the peripheral bead 17, the repair being effected without disturbing the body 13, and the peripheral cushioning band 12 then serving as a cement for securing the repaired light in position. The flaring form of the opening left in the concrete by breaking out the old light provides a firm seat for the repaired light capable of supporting it against downward pressure.

I claim as my invention—

1. In a pavement, in combination, a reinforced concrete body, lights of glass embedded in the concrete body and carried thereby, and a waterproof peripheral cushioning band surrounding each of the lights of glass and adhering to the concrete and to the glass.

2. In combination, a reinforced concrete pavement having light-emitting apertures with upwardly-flaring side walls, glass lights having tapered peripheral walls complementary to the flaring side wall of the apertures seated therein, and a waterproof peripheral cushioning band surrounding each of the glass lights, said band adhering to the concrete and to the glass.

WILLIAM D. BRADLEY.

Witnesses:
CHARLES B. GILLSON,
E. M. KLATCHER.